(12) United States Patent
Jung et al.

(10) Patent No.: US 10,286,749 B2
(45) Date of Patent: May 14, 2019

(54) DUAL ZONE TYPE AIR CONDITIONER FOR VEHICLE

(71) Applicant: HANON SYSTEMS, Daejeon (KR)

(72) Inventors: Jae Hwan Jung, Daejeon (KR); Tae Yun Kong, Daejeon (KR); In Hyeok Kim, Daejeon (KR); Tae Wan Kim, Daejeon (KR); Jeong Hun Seo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 91 days.

(21) Appl. No.: 15/511,356

(22) PCT Filed: Dec. 2, 2015

(86) PCT No.: PCT/KR2015/013021
§ 371 (c)(1),
(2) Date: Mar. 15, 2017

(87) PCT Pub. No.: WO2016/089094
PCT Pub. Date: Jun. 9, 2016

(65) Prior Publication Data
US 2017/0291468 A1 Oct. 12, 2017

(30) Foreign Application Priority Data

Dec. 2, 2014 (KR) .......................... 10-2014-0170715
Dec. 2, 2015 (KR) .......................... 10-2015-0170339

(51) Int. Cl.
*B60H 1/00* (2006.01)

(52) U.S. Cl.
CPC ..... *B60H 1/00064* (2013.01); *B60H 1/00678* (2013.01); *B60H 2001/00092* (2013.01);
(Continued)

(58) Field of Classification Search
CPC ........ B60H 1/00678; B60H 2001/0092; B60H 2001/00192; B60H 2001/00135; B60H 1/00064
See application file for complete search history.

(56) References Cited

U.S. PATENT DOCUMENTS 4,506,699 A * 3/1985 Tschudin-Mahrer ..... B32B 5/18
137/375
9,802,463 B2 * 10/2017 Maeda ................. B60H 1/3227
(Continued)

FOREIGN PATENT DOCUMENTS

KR 20050104173 A 11/2005
KR 20070101006 A 10/2007
(Continued)

OTHER PUBLICATIONS

International Search Report and Written Opinion dated Feb. 22, 2016 from International Patent Application Serial No. PCT/KR2015/013021, with English translation of International Search Report.

*Primary Examiner* — Cassey D Bauer
(74) *Attorney, Agent, or Firm* — Dickinson Wright PLLC

(57) ABSTRACT

Disclosed therein is a dual zone type air conditioner for a vehicle, which includes: an air volume control door mounted between a blower and an evaporator for controlling the degree of opening of first and second passageways so as to control the volume of air blown to the inside of an air-conditioning case; and bypass passageways disposed in the air volume control door to supply a predetermined air volume to a closed passageway even though the air volume control door is at the location to close the first passageway or the second passageway, thereby preventing a sudden change in air volume by widening a control interval of the air volume control door because the first-stage air volume can be realized even though the air volume control door closes one of the air passageways, and reducing a whistle
(Continued)

noise by securing a predetermined cross-sectional area of the air passageway through the bypass passageways even though the cross-sectional area of the air passageway gets narrower while the air volume control door closes one of the air passageways.

11 Claims, 11 Drawing Sheets

(52) U.S. Cl.
CPC ............ *B60H 2001/00135* (2013.01); *B60H 2001/00192* (2013.01)

(56) References Cited

U.S. PATENT DOCUMENTS

| | | | |
|---|---|---|---|
| 2006/0223431 A1 | 10/2006 | Park et al. | |
| 2007/0293135 A1* | 12/2007 | Hori ................... | B60H 1/00678 454/121 |
| 2009/0093207 A1* | 4/2009 | Han ................... | B60H 1/00678 454/155 |
| 2010/0043470 A1* | 2/2010 | Kang ................ | B60H 1/00064 62/239 |
| 2010/0224253 A1* | 9/2010 | Azar ................. | B60H 1/00678 137/1 |
| 2014/0087646 A1* | 3/2014 | Kitamura ........... | B60H 1/00064 454/126 |

FOREIGN PATENT DOCUMENTS

| | | |
|---|---|---|
| KR | 20100091658 A | 8/2010 |
| KR | 20130067558 A | 6/2013 |

\* cited by examiner

PRIOR ART

DUAL ZONE TYPE AIR CONDITIONER FOR VEHICLE

CROSS-REFERENCE TO RELATED APPLICATIONS

This application is a U.S. National Stage of International Application No. PCT/KR2015/013021, filed Dec. 2, 2015, which claims the benefit and priority of KR 10-2014-0170715 filed Dec. 2, 2014 and KR 10-2015-0170339 filed Dec. 2, 2015. The entire disclosures of each of the above applications are incorporated herein by reference.

BACKGROUND OF THE INVENTION

Field of the Invention

The present invention relates to a dual zone type air conditioner for a vehicle, and more particularly, to a dual zone type air conditioner for a vehicle, which includes: an air volume control door mounted between a blower and an evaporator for controlling the degree of opening of first and second passageways so as to control the volume of air blown to the inside of an air-conditioning case; and bypass passageways disposed in the air volume control door to supply a predetermined air volume to a closed passageway even though the air volume control door is at the location to close the first passageway or the second passageway.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

According to mounted structures of an air blower unit, an evaporator unit and a heater core unit, such an air conditioner is classified into a three-piece type air conditioner where the air blower unit, the evaporator unit, and the heater core unit are disposed independently, a semi-center type air conditioner where the evaporator unit and the heater core unit are embedded in an air-conditioning case and the air blower unit is mounted separately, and a center-mounting type air conditioner where the three units are all embedded in the air-conditioning case.

Recently, a dual zone type air conditioner, which separately and independently provides air of different temperatures to a driver's seat and to a passenger's seat inside the vehicle to thereby individually heat and cool the seats according to the driver's or the passenger's need, has been disclosed.

FIG. 1 is a configurative diagram of a conventional air conditioner for a vehicle.

As shown in FIG. 1, the air conditioner 1 includes: an air-conditioning case 10 which has an air inflow port 27 formed at an inlet, a plurality of air outflow ports 28 formed at an outlet, and air passageways 26a and 26b formed inside the air conditioner 1 such that the air inflow port 27 and the air outflow ports 28 communicate with each other; an evaporator 2 and a heater core 3 respectively mounted on the air passageways 26a and 26b to be spaced apart from each other at a predetermined interval; a partition wall 30 for partitioning the air passageways 26a and 26b of the downstream side of the evaporator 2 into left and right air passageways 26a and 26b; and a blower 10 mounted at the air inflow port 27 of the air-conditioning case 20.

Here, the air-conditioning case 20 is divided into a right case and a left case from the partition wall 30 and the right and left cases are assemblable to each other.

Moreover, temperature-adjusting doors 25 for adjusting temperature are respectively mounted on the left and right air passageways 26a and 26b between the evaporator 2 and the heater core 3. A plurality of mode doors 24 are mounted on the air outflow ports 28 of the left and right air passageways 26a and 26b to carry out various air-conditioning modes, such as a vent mode, a bi-level mode, a floor mode, a mixing mode, and a defrost mode, while regulating the degree of opening of the corresponding air outflow port 28.

Furthermore, the blower 10 includes: indoor and outdoor air inlets (not shown) formed at the upper side and opened and closed by an indoor and outdoor air converting door (not shown) so as to selectively introduce indoor air and outdoor air; and a blower fan 15 mounted therein to blow the air introduced through the indoor and outdoor air inlets toward the air-conditioning case 20.

Additionally, an air volume control door 40 is mounted in front of the evaporator 2 in order to independently control the volume of air blown from the blower 10 to the left and right air passageways 26a and 26b of the air-conditioning case 20.

Such a conventional dual zone type air conditioner 1 independently heats and cools the driver's seat space or the passenger's seat space inside the vehicle through the following steps. Namely, the indoor air or outdoor air introduced into the air-conditioning case 20 by the blower 10 is cooled while passing through the evaporator 2 when the air conditioner is turned on. The cooled air is divided and introduced into the left and right air passageways 26a and 26b by the partition wall 30, is selectively heated by the heater core 3, and then, is supplied to the driver's seat or the passenger's seat inside the vehicle through the air outflow ports 28 formed at the downstream side of the air passageways 26a and 26b.

Moreover, temperature and volume of the air discharged toward the driver's seat and the passenger's seat can be independently controlled by control of the temperature-adjusting doors 25 respectively mounted on the left and right air passageways 26a and 26b of the air-conditioning case 20 and the air volume control door 40 mounted in front of the evaporator 2.

However, as shown in FIG. 1, such a conventional dual zone type air conditioner 1 has a disadvantage in that it is difficult to accurately control right and left air volumes because the cross-sectional area of the air passageways is uneven and the air volume control door 40 is mounted in front of the evaporator 2 with relatively uneven air flow.

In order to solve the above-mentioned problem, Korean Patent Laid-open No. 10-2010-0091658 which has been invented by the same inventor as the present invention discloses a dual zone type air conditioner for a vehicle and a control method thereof. In brief, an air volume control door for controlling the degree of opening of right and left passageways is mounted inside a path of an air inflow port of an air-conditioning case and an auxiliary partition wall is formed between the air volume control door and an evaporator, such that the air volume controlled by the air volume control door is partitioned and supplied into the right and left air passageways of the air-conditioning case.

Therefore, when the air volume control door is mounted at the air passageway with an even cross-sectional area, the air conditioner can accurately control air volume in the dual zones.

However, the conventional dual zone type air conditioner has a disadvantage in that it generates noise, such as a whistle, because the cross-sectional area of the passageway gets gradually narrower when the air volume door moves to the position to close the left passageway or the right passageway.

Furthermore, when the air volume control door closes the left passageway or the right passageway, air is not supplied to the closed passageway and the maximum air volume is supplied to the other passageway. Due to such a structure, when the air volume control door closes the left passageway or the right passageway, the closed passageway cannot be used even for the first-stage air volume. Finally, when the actuator controls the air volume control door from the first to the seventh, for instance, the maximum stage, the control interval per stage gets narrower, and hence, air volume is changed sharply when the stage is changed.

SUMMARY OF THE INVENTION

Accordingly, the present invention has been made to solve the above-mentioned problems occurring in the prior arts, and it is an object of the present invention to provide a dual zone type air conditioner for a vehicle, which includes: an air volume control door mounted between a blower and an evaporator for controlling the degree of opening of first and second passageways so as to control the volume of air blown to the inside of an air-conditioning case; and bypass passageways disposed in the air volume control door to supply a predetermined air volume to a closed passageway even though the air volume control door is at the location to close the first passageway or the second passageway, thereby preventing a sudden change in air volume by widening a control interval of the air volume control door because the first-stage air volume can be realized even though the air volume control door closes one of the air passageways, and reducing a whistle noise by securing a predetermined cross-sectional area of the air passageway through the bypass passageways even though the cross-sectional area of the air passageway gets narrower while the air volume control door closes one of the air passageways.

To accomplish the above object, according to the present invention, there is provided a dual zone type air conditioner for a vehicle, which includes: an air-conditioning case having an air inflow port formed at an inlet, a plurality of air outflow ports formed at an outlet and an air passageway formed therein to connect the air inflow port with the air outflow ports; an evaporator mounted inside the air-conditioning case; a blower connected to the air inflow port of the air-conditioning case to blow air to the inside of the air-conditioning case; an air volume control door which is mounted in a passageway between the blower and the evaporator and adjusts the degree of opening of the first passageway and the degree of opening of the second passageway inside the passageway according to a rotational angle so as to control the volume of air blown into the air-conditioning case; and bypass passageways formed in the air volume control door in order to supply a predetermined air volume to a closed passageway even when the air volume control door is located at a position to close the first passageway or the second passageway.

According to the present invention, the dual zone type air conditioner for a vehicle, which includes: an air volume control door mounted between a blower and an evaporator for controlling the degree of opening of first and second passageways so as to control the volume of air blown to the inside of an air-conditioning case; and bypass passageways disposed in the air volume control door to supply a predetermined air volume to a closed passageway even though the air volume control door is at the location to close the first passageway or the second passageway, can prevent a sudden change in air volume by widening a control interval of the air volume control door and reduce an error in air volume stages according to control deviations of an actuator because the first-stage air volume can be realized even though the air volume control door closes one of the air passageways.

Additionally, the dual zone type air conditioner for a vehicle according to the present invention can reduce a whistle noise by securing a predetermined cross-sectional area of the air passageway through the bypass passageways even though the cross-sectional area of the air passageway gets narrower while the air volume control door closes one of the air passageways.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
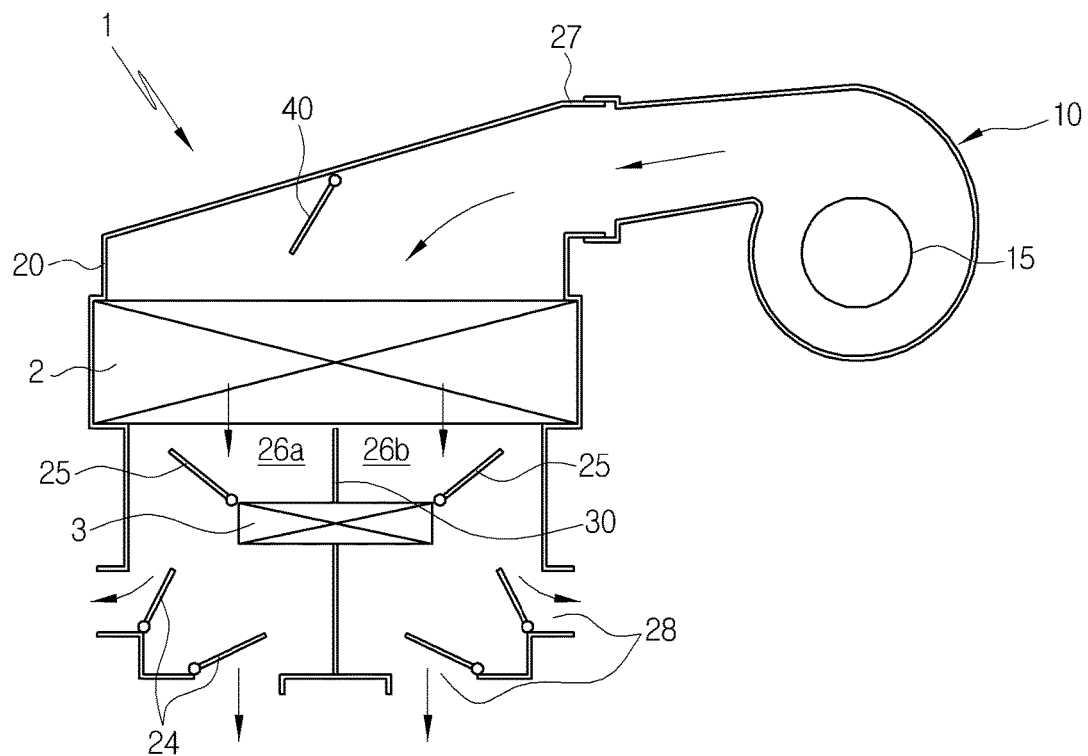
FIG. 1 is a configurative diagram of a conventional dual zone type air conditioner for a vehicle.

Hereinafter, reference will be now made in detail to the preferred embodiments of the present invention with reference to the attached drawings.

As shown in the drawing, a dual zone type air conditioner 100 for a vehicle according to a preferred embodiment of the present invention includes: an air-conditioning case 110 which has an air inflow port 111 formed at an inlet, a plurality of air outflow ports 120, such as a defrost vent 121, a face vent 122 and a floor vent 123, formed at an outlet and an air passageway formed inside the air-conditioning case to connect the air inflow port 111 with the air outflow ports 120; an evaporator 101 and a heater core 102 mounted in the air passageway to be spaced apart from each other at a predetermined interval in order; a partition wall 105 for partitioning a downstream side air passageway of the evaporator 101 into a first air passageway 106a and a second air passageway 106b; and a blower 10 mounted at the air inflow port 111 of the air-conditioning case 110 to which an outlet 16 of the blower 10 is connected so as to blow air to the inside of the air-conditioning case 110.

Here, the air-conditioning case 110 is formed when separate left and right cases 110a and 110b are assembled to each other.

Moreover, the first air passageway 106a formed inside the air-conditioning case 110 corresponds to the direction of the driver's seat located at the left of the vehicle interior and the second air passageway 106b corresponds to the direction of the passenger's seat located at the right of the vehicle interior. Of course, the direction of the driver's seat and the direction of the passenger's seat may be varied according to the position of a handle of the vehicle.

Furthermore, temperature-adjusting doors 130 for adjusting temperature are mounted between the evaporator 101 and the heater core 102. The temperature-adjusting doors 130 are respectively mounted on the first and second air passageways 106a and 106b to adjust the degree of opening of the air passageway bypassing the heater core 102 and the degree of opening of the air passageway passing the heater core 102.

Additionally, a plurality of mode doors 124 are mounted at the defrost vent 121, the face vent 122 and the floor vent 123 to selectively distribute the air, which selectively passed the heater core 102 after passing through the evaporator 101, to ducts (not shown) communicating with specific locations of the interior of the vehicle, thereby carrying out various air outflow modes.

In the meantime, the blower 10 includes: an indoor air inlet (not shown) and an outdoor air inlet 11 opened and closed by an indoor and outdoor air converting door (not shown) to selectively introduce indoor air and outdoor air to the upper part; and a blower fan 15 mounted in the blower 10 to blow the air introduced through the indoor and outdoor air inlets toward the air-conditioning case 110.

Moreover, the air inflow port 111 of the air-conditioning case 110 extends to have a straight section from the side of the air-conditioning case 110 toward the outlet 16 of the blower 10 so as to be connected with the outlet 16 of the blower 10.

That is, as shown in the drawing, inside air passageways 141 and 142 of the air inflow port 111 are formed to be at right angles to the first and second air passageways 106a and 106b partitioned by the partition wall 105 inside the air-conditioning case 110. In this instance, the air inflow port 111 is formed to be parallel with the evaporator 101.

Furthermore, the dual zone type air conditioner according to the preferred embodiment of the present invention includes an air volume control door 150 mounted inside the passageway between the evaporator 101 and the blower 10 to control the volume of the air blown to the inside of the air-conditioning case 110, namely, the first and second air passageways 106a and 106b, by adjusting the degree of opening of the first passageway 161 and the second passageway 162 inside the passageway depending on a rotational angle.

Preferably, the air volume control door 150 is mounted inside the air inflow port 111, which is relatively uniform in air flow because the cross-sectional area of the air flow passageway is uniform.

In other words, because the inside passageway of the air inflow port 111 is uniform in cross-sectional area, the passageway of the air inflow port 111 makes the air flow more uniform than other parts of the air-conditioning case 110. Therefore, because there is no change in air volume, the air volume control door 150 is mounted inside the air inflow port 111.

As described above, because the cross-sectional area of the air passageway is uniform and the air flow is relatively uniform, the air volume control door 150 is mounted inside the air inflow port 111 where there is no change in air volume so as to accurately control the air volume in right and left zones.

Additionally, the air volume control door 150 is actuated by an actuator 155 mounted on the upper side or the lower side of the air inflow port 111. That is, the degree of opening of the first passageway 161 and the degree of opening of the second passageway 162 are controlled while the rotational angle of the air volume control door 150 is changed according to voltage applied to the actuator 155.

The air volume control door 150 includes: a rotary shaft 151 vertically mounted at the center of the inside of the air inflow port 111; and a plate 152 which extends from the side of the rotary shaft 151 toward the outlet 16 of the blower 10 to control the degree of opening of the first passageway 161 and the degree of opening of the second passageway 162.

In this instance, an end portion of the rotary shaft 151 of the air volume control door 150 is connected with the actuator 155 mounted on the outer face of the air inflow port 111.

Furthermore, an auxiliary partition wall 160 is formed between the air volume control door 150 and the evaporator 101 so that the air supplied to the first passageway 161 and the second passageway 162 flows into the first and second air passageways 106a and 106b of the air-conditioning case 110 in a partitioned state.

In other words, the auxiliary partition wall 160 partitions the upstream side air passageway of the evaporator 101 into right and left sides.

The front end portion of the auxiliary partition wall 160 abuts on the rear side of the rotary shaft 151 of the air volume control door 150, and the rear end portion of the auxiliary partition wall 160 is bent toward the evaporator 101 and abuts on the front side of the evaporator 101.

In this instance, the rear end portion of the auxiliary partition wall 160 abutting on the front side of the evaporator 101 is located on the same line with the partition wall 105 mounted inside the air-conditioning case 110.

Therefore, because the air which is introduced while being controlled in volume at the right and left sides, namely, first and second passageways, by the air volume control door 150 is perfectly partitioned by the auxiliary partition wall 160 formed between the air volume control door 150 and the evaporator 101, the airs of the right and left sides, namely, first and second passageways, are not mixed together till the introduced airs flow into the first and second air passageways 106a and 106b, so that a perfect dual zone type air volume control system can be realized.

Additionally, the dual zone type air conditioner according to the preferred embodiment of the present invention further includes bypass passageways 170 and 171 which are formed by the reduced cross-sectional area of the air volume control door 150 in order to supply a predetermined air volume to the closed passageway even though the air volume control door 150 is located at the position to close the first passageway 161 or the second passageway 162.

The bypass passageways 170 and 171 formed by the reduced cross-sectional area of the air volume control door 150 have two types as follows.

First, the bypass passageway 170 is formed in such a way as to directly penetrate the air volume control door 150. Namely, the bypass passageway 170 with a predetermined cross-sectional area is formed to penetrate the plate 152 of the air volume control door 150.

Second, the bypass passageway 171 is formed between the first passageway 161 or the second passageway 162 and the air volume control door 150 due to the reduced size of the air volume control door 150. That is, because an axial length of the air volume control door 150 is reduced, the bypass passageway 171 is formed at an axial end portion of the air volume control door 150.

Figure 5:
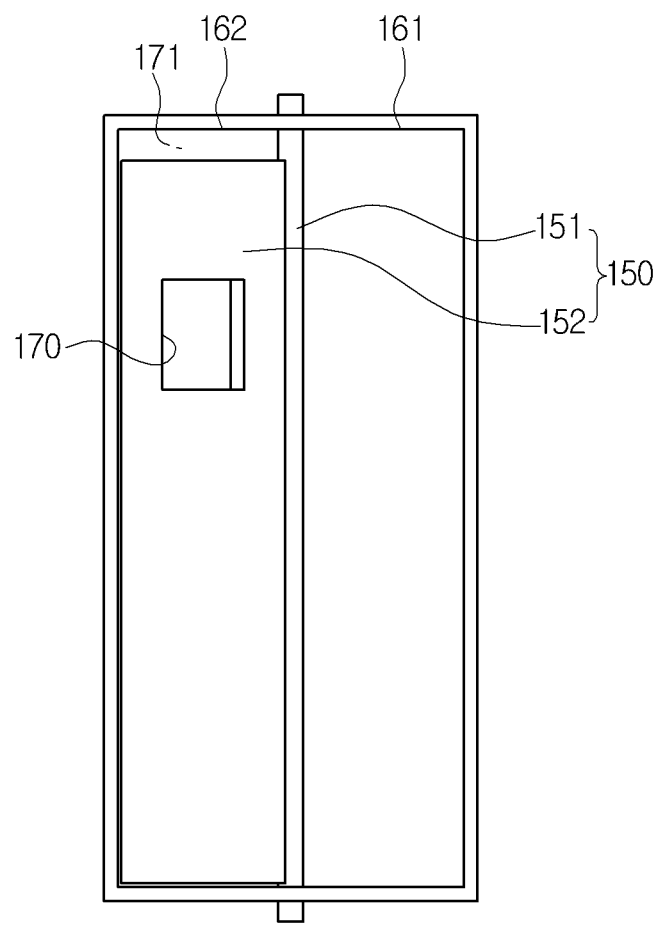
FIG. 5 is a front view of FIG. 4.

As shown in FIG. 5, in the state where the air volume control door 150 is located at the position to close the second passageway 162, the bypass passageway 171 is formed between the top of the air volume control door 150, namely, between the upper side of the inside of the second passageway 162 and the top of the air volume control door 150. Of course, the bypass passageway 171 may be formed at the opposite side.

Moreover, all or one of the bypass passageway 170 formed passing through the air volume control door 150 and the bypass passageway 171 formed at the axial end portion of the air volume control door 150 may be formed.

Figure 6:
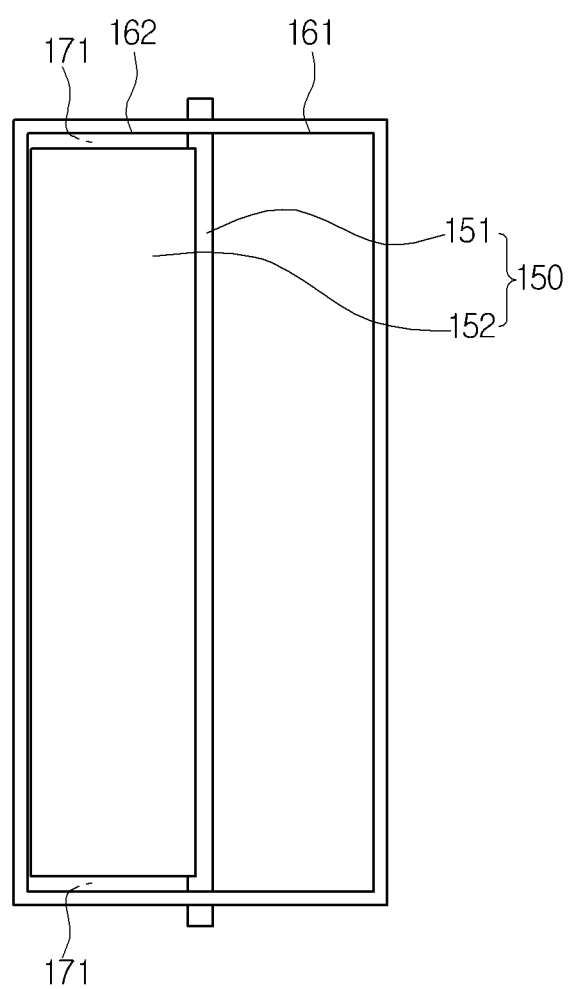
FIG. 6 is a view showing a state where bypass passageways are formed at upper and lower sides of the air volume control door.
Figure 7:
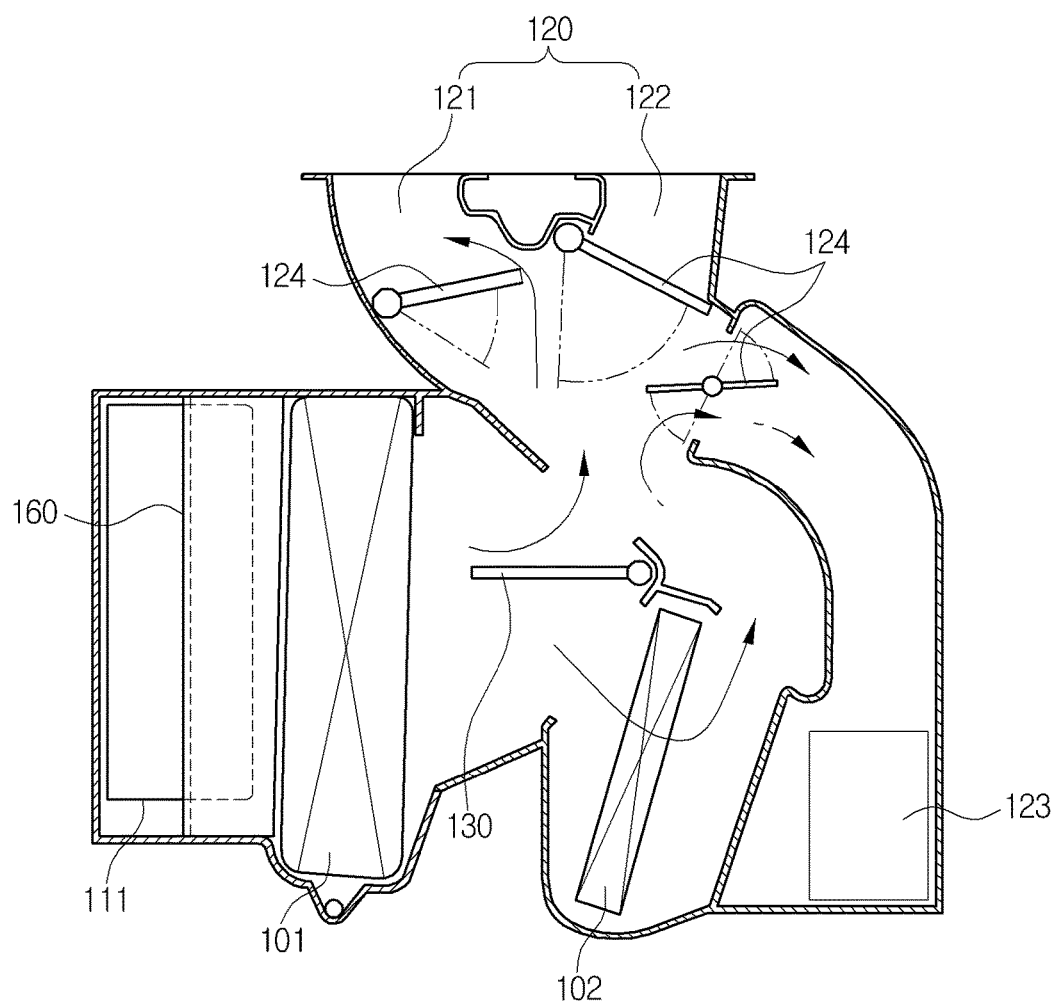
FIG. 7 is a sectional view of an air-conditioning case in FIG. 3.

Furthermore, as shown in FIG. 6, the bypass passageway 171 may be formed at both axial end portions of the air volume control door 150 by reduction of the axial length of the air volume control door 150.

In the meantime, when the air volume control door 150 closes the first passageway 161 or the second passageway 162, the side of the air volume control door 150 comes into contact with the side surface of the inner face of the air inflow port 111 to seal the air inflow port 111 and prevent air leakage, but the top and the bottom of the air volume control door 150 are spaced apart from the upper and lower sides of the air inflow port 111 not to seal the air inflow port 111 so that the air bypasses.

As described above, even though the air volume control door 150 is located at the position to close the first passageway 161 or the second passageway 162, a fixed air volume can be always supplied through the bypass passageways 170 and 171. That is, when the air volume control door 150 closes one of the passageways, the closed passageway can secure the first-stage air volume.

In other words, the first-stage air volume is supplied to the first passageway 161 or the second passageway 162, which is closed by the air volume control door 150, through the bypass passageways 170 and 171 and the maximum stage air volume is supplied to the other passageway.

Figure 11:
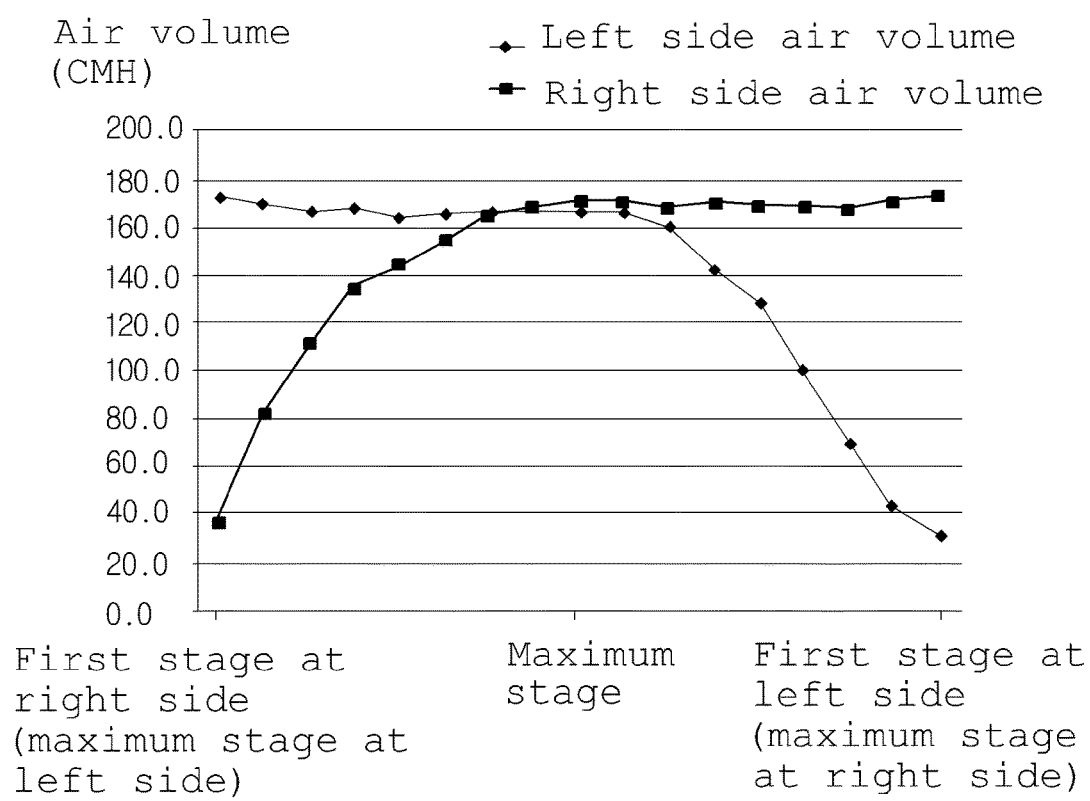
FIG. 11 is a graph showing changes in left air volume and right air volume according to a change in stage of the dual zone type air conditioner for the vehicle according to the preferred embodiment of the present invention.

FIG. 11 is a graph showing changes in air volume of the left side and air volume of the right side according to a change of stages, and here, the first passageway 161 is located at the left and the second passageway 162 is located at the right.

Therefore, when the air volume control door 150 is located at the position to close the second passageway 162, the right side is at the first stage and the left side is at the maximum stage. When the air volume control door 150 is located at the position to close the first passageway 161, the left side is at the first stage and the right side is at the maximum stage.

Of course, when the air volume control door 150 is located between the first passageway 161 and the second passageway 162, the left side and the right side are at the maximum stage.

The stages are varied according to the position of the air volume control door 150 by voltage applied to the actuator 155 of the air volume control door 150.

As an example, when voltage applied to the actuator 155 is 0.3V, the right side the air volume control door 150 is located at the position to close the second passageway 162 and the right side is at the first stage, and in this instance, the left side is at the maximum stage because the first passageway 161 is in the maximum open state.

When the voltage rises from 0.3V at a predetermined interval, the air volume control door 150 opens the second passageway 162 step by step and the stage of the right side also rises step by step. In this instance, the first passageway 161 keeps the maximum open state till the voltage reaches 2.5V.

When the voltage reaches 2.5V, the air volume control door 150 is located between the first passageway 161 and the second passageway 162, and the right side (left side) becomes the maximum stages.

Continuously, when voltage rises from 2.5V at a predetermined interval, the air volume control door 150 gets out of the second passageway 162 and closes the first passageway 161 step by step, and the stage of the left side descends step by step. In this instance, the second passageway 162 keeps the maximum open state till voltage reaches 4.7V.

When voltage reaches 4.7, the air volume control door 150 is located at the position to close the first passageway 161 and the left side becomes the first stage. In this instance, the right side becomes the maximum stage because the second passageway 162 is in the maximum open state.

Therefore, because the first stage air volume can be realized even in the state where the air volume control door 150 closes the first passageway 161 or the second passageway 162, the control interval by stages of the air volume control door 150 gets wider, so that the dual zone type air conditioner according to the present invention can prevent a sharp change in air volume and reduce error by stages according to the control deviation of the actuator 155.

Moreover, while the air volume control door 150 closes the first passageway 161 or the second passageway 162, even though the cross-sectional area of the passageway gets narrower, because a predetermined cross-sectional area of the passageway is secured through the bypass passageways 170 and 171, a whistle noise can be reduced.

In the meantime, when the air volume of the first passageway 161 and the second passageway 162 is controlled by the air volume control door 150, the air volume of the first air passageway 106a and the second air passageway 106b of the air-conditioning case 110 corresponding to the first passageway 161 and the second passageway 162 is also controlled to the same air volume.

Figure 8:
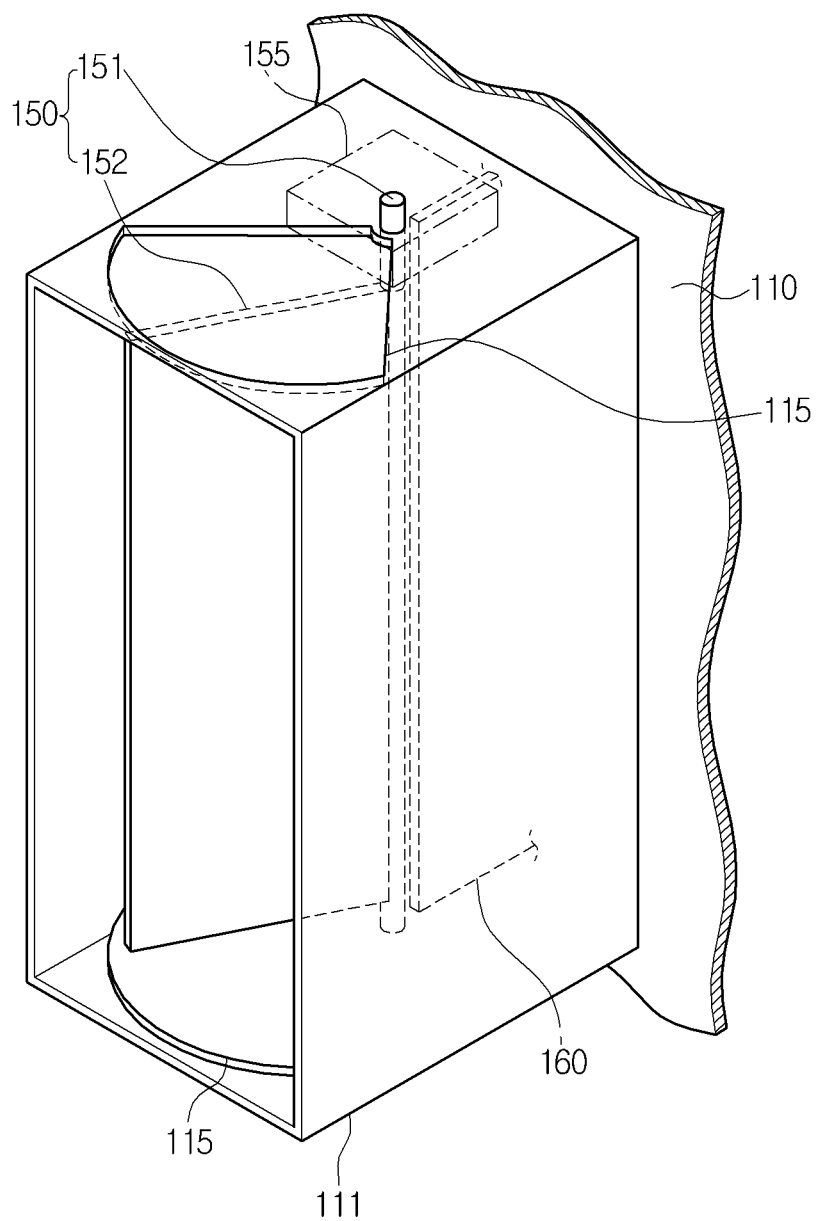
FIG. 8 is a perspective view showing a state where a stepped portions are formed at upper and lower sides of an air inflow port of the air-conditioning case in the dual zone type air conditioner for the vehicle according to the preferred embodiment of the present invention.

FIG. 8 is a perspective view showing a state where stepped portions are formed at upper and lower sides of the air inflow port of the air-conditioning case. The stepped portions 115 are formed on the inner surface of the air inflow port 111, on which the rotary shaft 151 is mounted, in correspondence to a rotation range of the air volume control door 150.

That is, the stepped portions 115 protruding toward the bypass passageway 171 are formed on the upper and lower sides of the inner surface of the air inflow port 111, the cross-sectional area of the bypass passageway 171 can be controlled by adjusting the height of the stepped portions 115.

Figure 9:
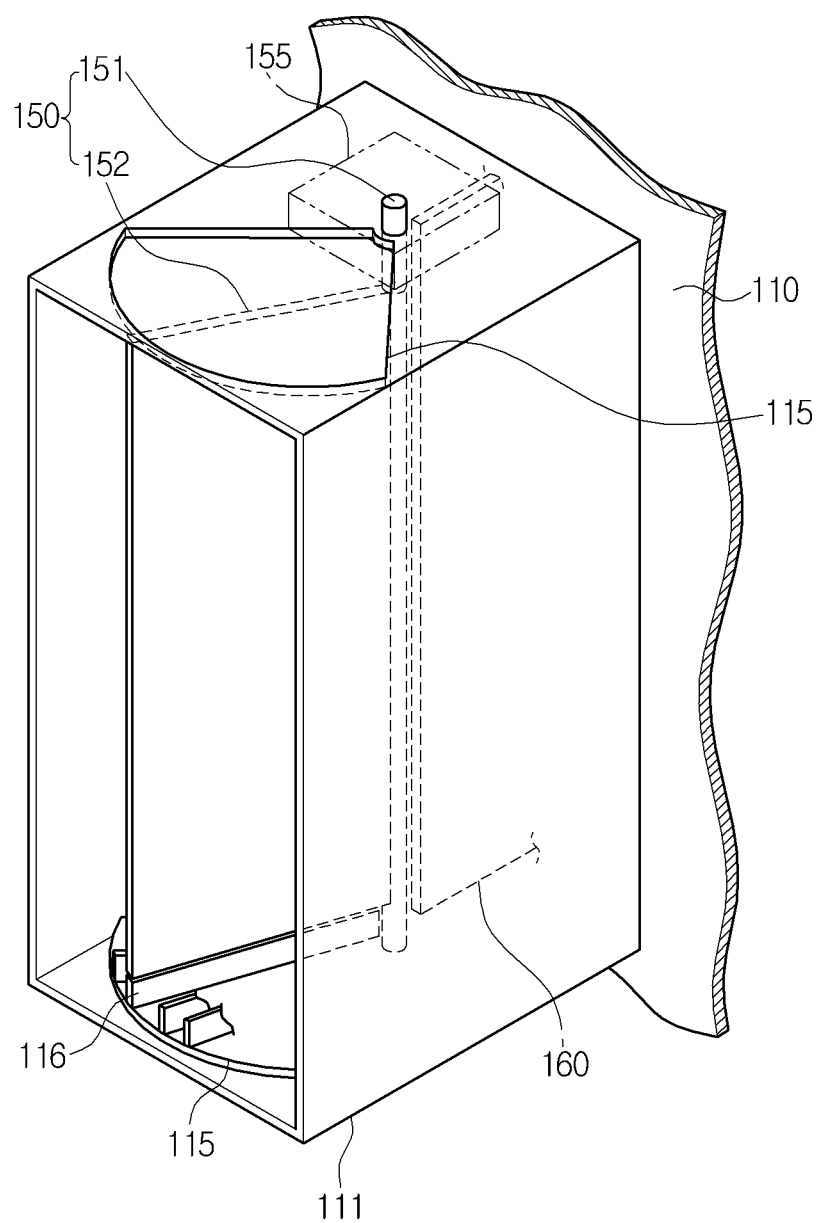
FIG. 9 is a perspective view showing a state where a door sealing part is formed on the inner surface of the stepped portion in FIG. 8.

FIG. 9 is a perspective view showing a state where door sealing parts are formed on the inner surfaces of the stepped portions of FIG. 8. The door sealing parts 116 are protrudingly formed at positions of the stepped portions 115, which correspond to the rotational angle by stages of the air volume control door 150.

In other words, when the air volume control door 150 is at the position (first stage position) to close the first passageway 161 or the second passageway 162, the predetermined air volume (first stage air volume) is supplied to the closed passageway through the bypass passageway 171, and the door sealing part 116 closes the bypass passageway 171 at positions by stages except the first stage.

Therefore, because the bypass passageway 171 is closed at the positions by stages except the first stage, air volume is controlled just by the degree of opening according to the rotational angle by stages of the air volume control door 150.

In the meantime, in FIG. 9, for convenience's sake, the door sealing part 116 is illustrated at the stepped portion 115 formed at the lower side of the air inflow port 111, but is also formed at the stepped portion 115 formed at the upper side of the air inflow port 111.

Figure 10:
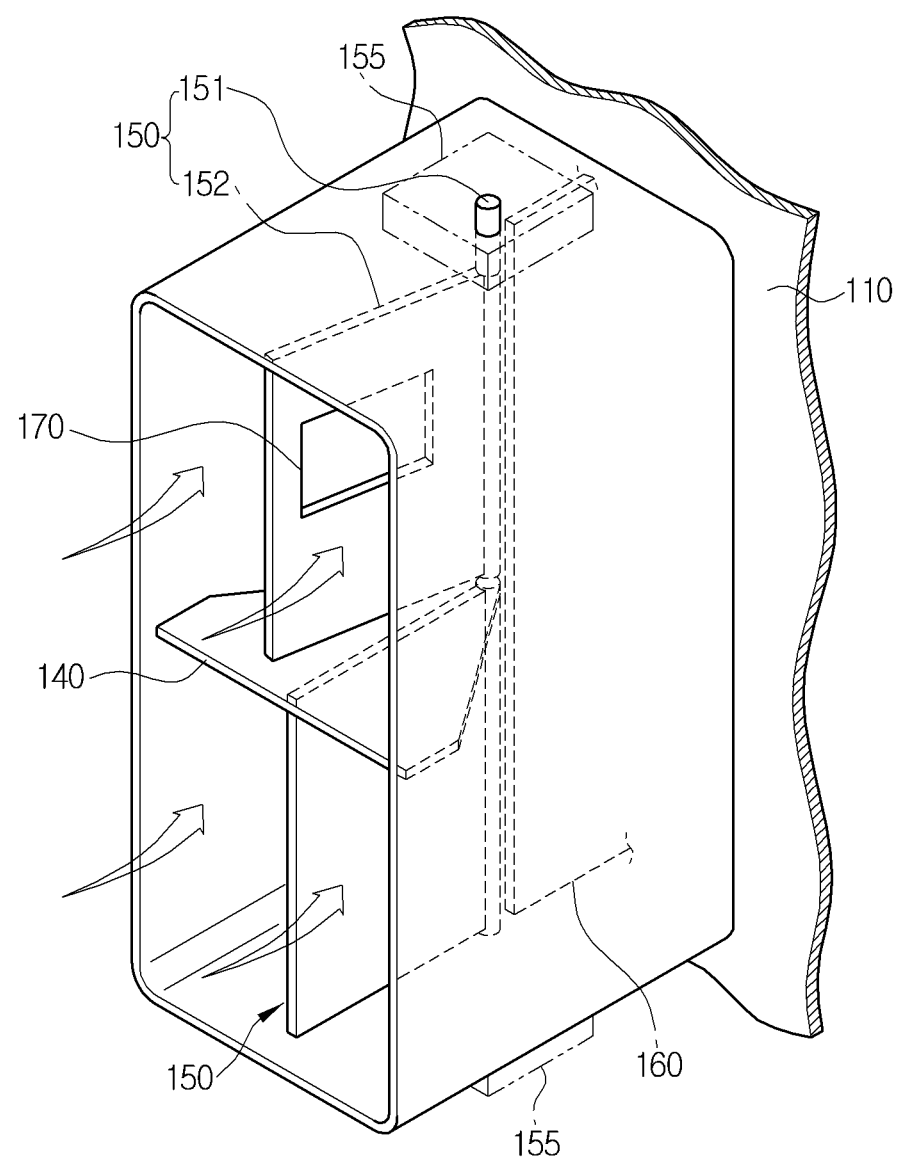
FIG. 10 is an enlarged perspective view showing air volume control doors of the dual zone type air conditioner for the vehicle according to another preferred embodiment of the present invention.

Additionally, FIG. 10 illustrates air volume control doors 150 according to another preferred embodiment, wherein two air volume control doors 150 are mounted at upper and lower parts.

In this instance, the actuators 155 which are operated separately are mounted at the top and the bottom of the air inflow port 111 to separately operate the air volume control doors 150.

Moreover, a sealing wall 140 is formed inside the air inflow port 111. The sealing wall 140 is formed between the two air volume control doors 150 to partition the air volume control doors 150 from each other.

Such a sealing wall 140 is formed to partition the inside of the air inflow port 111 into an upper part and a lower part.

Therefore, because the two air volume control doors 150 partitioned by the sealing wall 140 controls the air volume introduced into the first and second passageways 161 and 162, the dual zone type air conditioner can control right and left air volumes more accurately than the air conditioner which controls air volumes of the first and second passageways 161 and 162 using one air volume control door 150.

As described above, as shown in FIG. 10, because the bypass passageways 170 and 171 can be formed at the air volume control doors 150 even in the structure having the two air volume control doors 150, the dual zone type air conditioner according to this preferred embodiment can obtain the same effect as the former embodiment.

Meanwhile, in FIG. 10, it is illustrated that the bypass passageway 170 is formed at one of the two air volume control doors 150, but the bypass passageways 170 can be formed at all of the two air volume control doors 150.

Hereinafter, an air flow process of the dual zone type air conditioner for the vehicle according to the preferred embodiment of the present invention will be described. Here, a cooling mode (See FIG. 2) will be described as a representative mode, and the operation at the position that the air volume control door 150 closes the second passageway 162 will be described.

First, the air blown through the outlet 16 of the blower 10 is introduced into the air inflow port 111 by operation of the blower 10.

Figure 2:
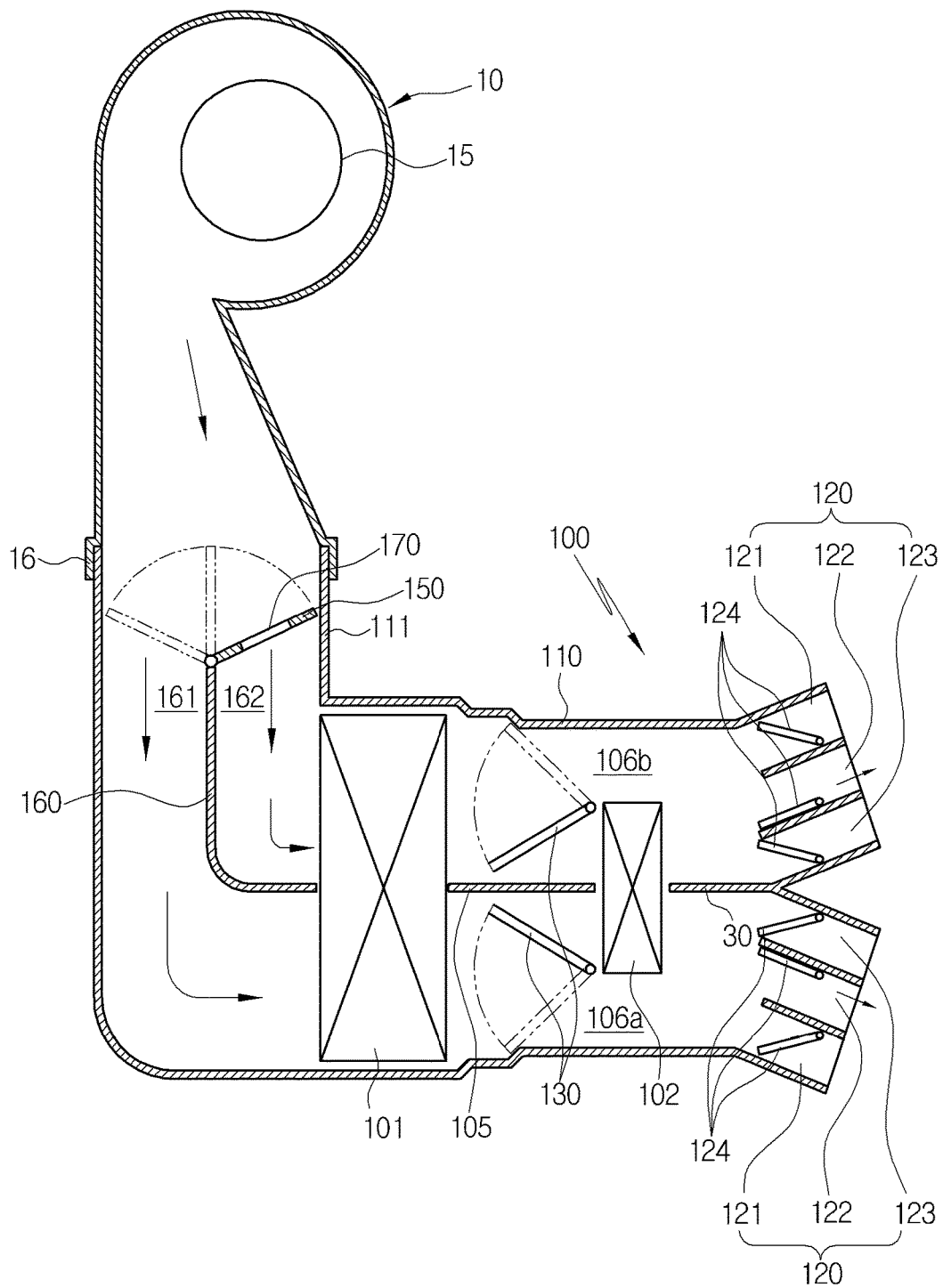
FIG. 2 is a configurative diagram of a dual zone type air conditioner for a vehicle according to a preferred embodiment of the present invention.
Figure 3:
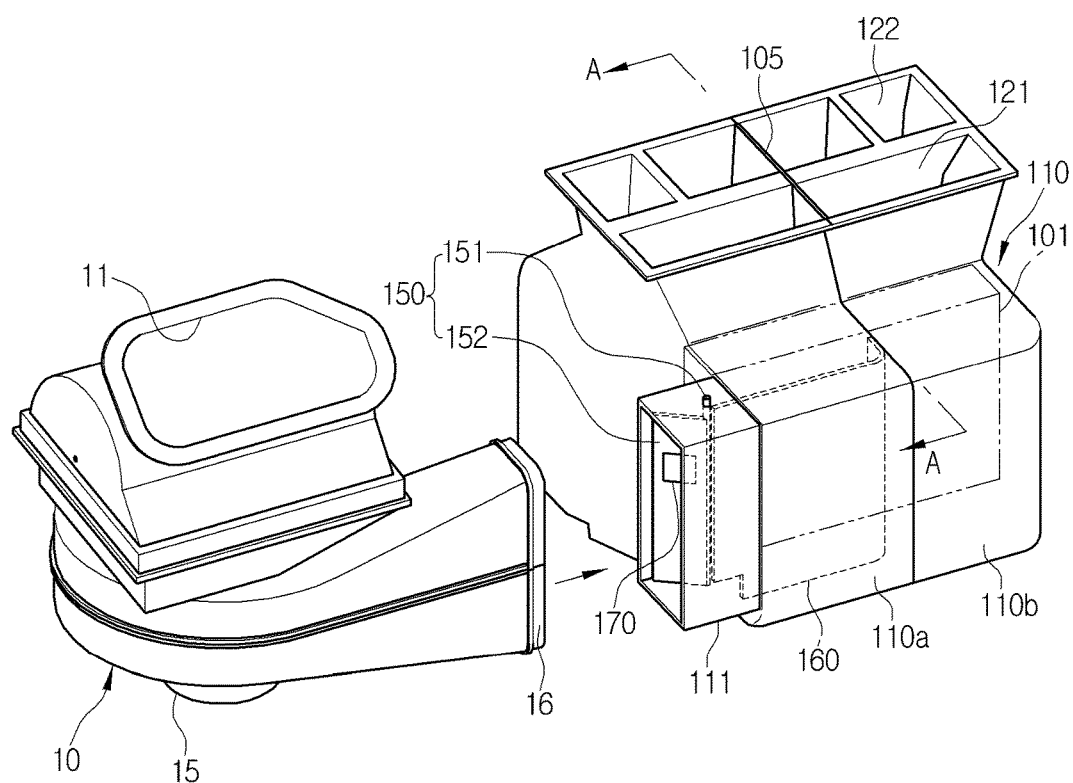
FIG. 3 is a perspective view showing a state where the dual zone type air conditioner for the vehicle according to the preferred embodiment of the present invention is applied to a semi-center type air conditioner.
Figure 4:
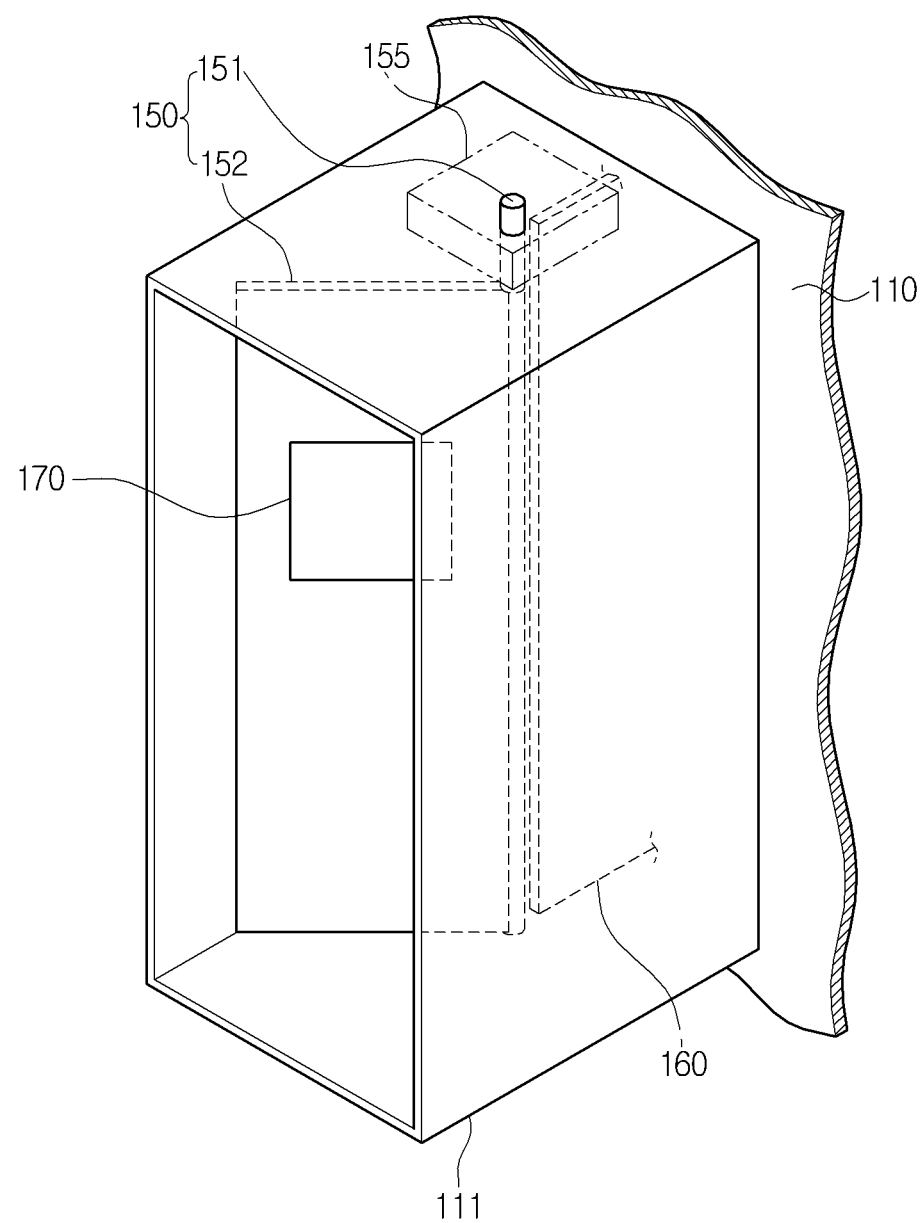
FIG. 4 is an enlarged perspective view showing the part where an air volume control door is mounted in FIG. 3.

The air introduced into the air inflow port 111 is controlled in right and left air volumes by the air volume control door 150. In this instance, as shown in FIG. 2, because the air volume control door 150 closes the second passageway 162, the first stage air volume is supplied to the second passageway 162 through the bypass passageway 170, and the maximum stage air volume is supplied to the first passageway 161.

Continuously, the air controlled as the maximum stage air volume in the left side and as the first stage air volume in the right side is introduced into the air-conditioning case 110 in the state where the controlled air is completely divided by the auxiliary partition wall 160, and then, passes through the evaporator 101.

The air passing through the evaporator 101 is changed into cold air while passing through the evaporator 101, and cold air heat-exchanged in the evaporator 101 is divided into the first air passageway 106a and the second air passageway 106b by the partition wall 105 inside the air-conditioning case 110.

Continuously, the air which flows by being divided into the first air passageway 106a and the second air passageway 106b bypasses the heater core 102 by the temperature-adjusting door 130, and then, is discharged to the interior of the vehicle through the vents 121, 122 and 123 opened by the mode doors 124, so that the air conditioner cools the driver's seat (left side) of the interior of the vehicle while supplying the maximum stage air volume to the driver's seat and cools the passenger's seat (right side) while supplying the first stage air volume to the passenger's seat.

Of course, when the air volume control door 150, the temperature-adjusting doors 130 mounted at the right and left sides of the partition wall 105 to be operated individually, and the mode doors 124 are controlled independently, the driver's seat and the passenger's seat can be independently controlled at desired air volume, temperature and air outflow mode.

In the meantime, in the above, only the cooling mode is described, but various air-conditioning modes including a heating mode can be carried out, and detailed description of the air-conditioning modes will be omitted because such air-conditioning modes are well-known.

What is claimed is:

1. A dual zone type air conditioner for a vehicle which includes: an air-conditioning case having an air inflow port formed at an inlet, a plurality of air outflow ports formed at an outlet and first and second air passageways formed therein to connect the air inflow port with the air outflow ports;

an evaporator mounted inside the air-conditioning case;

a blower (10) connected to the air inflow port of the air-conditioning case to blow air to the inside of the air-conditioning case; and an air volume control door which is mounted in a main passageway between the blower and the evaporator and adjusts the degree of opening of the first passageway and the degree of opening of the second passageway inside the passageway according to a rotational angle so as to control the volume of air blown into the air-conditioning case, comprising:

bypass passageways formed in the air volume control door in order to supply a predetermined air volume to a closed passageway even when the air volume control door is located at a position to close the first passageway or the second passageway.

2. The dual zone type air conditioner according to claim 1, wherein the bypass passageway penetrates through the air volume control door.

3. The dual zone type air conditioner according to claim 1, wherein the bypass passageway is formed between the first passageway or the second passageway and the air volume control door.

4. The dual zone type air conditioner according to claim 3, wherein the bypass passageway is disposed at an axial end portion of the air volume control door by reduction of the axial length of the air volume control door.

5. The dual zone type air conditioner according to claim 3, wherein the bypass passageways are disposed at both axial end portions of the air volume control door by reduction of the axial length of the air volume control door.

6. The dual zone type air conditioner according to claim 1, wherein the first stage air volume is supplied to one of the first passageway and the second passageway, which is closed by the air volume control door, through the bypass passageways, and the maximum stage air volume is supplied to the other passageway.

7. The dual zone type air conditioner according to claim 1, wherein the air volume control door comprises:
 a rotary shaft vertically mounted inside the air inflow port; and
 a plate which extends from the side of the rotary shaft toward an outlet of the blower to control the degree of opening of the first passageway and the degree of opening of the second passageway.

8. The dual zone type air conditioner according to claim 7, wherein stepped portions are formed on the inner surface of the air inflow port, on which the rotary shaft is mounted, in correspondence to a rotation range of the air volume control door.

9. The dual zone type air conditioner according to claim 8, wherein door sealing parts are protrudingly formed at positions of the stepped portions, which correspond to the rotational angle by stages of the air volume control door.

10. The dual zone type air conditioner according to claim 1, wherein a partition wall for partitioning a downstream side air passageway of the evaporator into a first downstream air passageway and a second downstream air passageway is mounted inside the air-conditioning case.

11. The dual zone type air conditioner according to claim 10, further comprising:
 an auxiliary partition wall formed between the air volume control door and the evaporator so that the air supplied to the first passageway and the second passageway flows into the first and second downstream air passageways of the air-conditioning case in a partitioned state.

* * * * *